United States Patent
Inoue et al.

[11] Patent Number: 6,115,685
[45] Date of Patent: Sep. 5, 2000

[54] PHASE DETECTION APPARATUS AND METHOD, AND AUDIO CODING APPARATUS AND METHOD

[75] Inventors: Akira Inoue, Tokyo; Masayuki Nishiguchi, Kanagawa, both of Japan

[73] Assignee: Sony Corporation, Tokyo, Japan

[21] Appl. No.: 09/236,500

[22] Filed: Jan. 26, 1999

[30] Foreign Application Priority Data

Jan. 30, 1998 [JP] Japan .............................. P10-019963

[51] Int. Cl.$^7$ .............................. G10L 11/04; G10L 19/04
[52] U.S. Cl. ..................... 704/205; 704/207; 704/219; 704/220
[58] Field of Search .................... 704/205, 207, 704/219, 220

[56] References Cited

U.S. PATENT DOCUMENTS

| | | | |
|---|---|---|---|
| 4,065,665 | 12/1977 | Rietsch | 702/72 |
| 5,381,512 | 1/1995 | Holton et al. | 704/232 |
| 5,727,119 | 3/1998 | Davidson et al. | 704/203 |

*Primary Examiner*—David R. Hudspeth
*Assistant Examiner*—Daniel Abebe
*Attorney, Agent, or Firm*—Jay H. Maioli

[57] ABSTRACT

Phase detection apparatus and method, wherein a one-pitch cycle is cutout of an input signal waveform and then that cutout one-pitch cycle is dimension converted into $2^k$-sample data. The data conversion is performed on respective higher harmonic components of the input signal according to a real part and an imaginary part of the orthogonal data that has been converted.

18 Claims, 10 Drawing Sheets

6,115,685

PHASE DETECTION APPARATUS AND METHOD, AND AUDIO CODING APPARATUS AND METHOD

BACKGROUND OF THE INVENTION

1. Field of the Invention

The present invention relates to a phase detection apparatus and method for detecting phases of harmonics components in a sinusoidal wave combine coding or the like, and the present invention also relates to an audio coding apparatus and method.

2. Description of the Prior Art

Various coding methods are known to carry out signal compression utilizing statistical features and human hearing sense characteristics in a time region and frequency region of an audio signal (including a voice signal and an acoustic signal). These coding methods can be briefly classified into a time region coding, frequency region coding, and analysis-synthesis coding.

As a high-efficiency coding of an audio signal or the like, there are known sinusoidal coding such as harmonic coding and multi-band excitation (MBE) coding, and sub-band coding (SBC), linear predictive coding (LPC), or discrete cosine transform (DCT), modified DCT (MDCT), fast Fourier transform (FFT), and the like.

In the high-efficiency audio coding using the sinusoidal coding such as the MBE coding, harmonic coding, and sinusoidal transform coding (STC) for an input audio signal or using these sinusoidal coding methods for an input audio signal LPC, information is transmitted on an amplitude or spectrum envelope of each sinusoidal wave (harmonics, higher harmonics) serving as a component of analysis-synthesis. However, no information on phase is transmitted. The phase is calculated during synthesis if necessary.

Accordingly, there is problem that an audio waveform reproduced after decoding is different from a waveform of the original input audio signal. That is, in order to reproduce the original waveform, it is necessary to detect and transmit a phase information of each harmonics (higher harmonics) component for each frame.

SUMMARY OF THE INVENTION

It is therefore an object of the present invention to provide a phase detection apparatus and method for realizing to reproduce an original waveform as well as an audio coding apparatus and method employing this phase detection technique.

In the phase detection apparatus and method according to the present invention, one-pitch cycle of an input signal waveform based on an audio signal is cut out on a time axis. The cut-out one-pitch cycle of samples is subjected to dimension-conversion into a $2^k$-sample data (k is an integer). This $2^k$-sample data is then subjected to an orthogonal conversion such as $2^k$-point FFT. According to a real part and an imaginary part of a data which has been orthogonally converted, a phase information is detected for each higher harmonics component of the aforementioned input signal.

According to another aspect of the present invention, the aforementioned phase detection is applied to an audio coding such as siusoidal coding.

Here, the aforementioned input signal waveform may be an audio signal waveform itself or a signal waveform of a short-term prediction residue of the audio signal.

Moreover, the aforementioned dimension conversion may be performed by performing oversampling and linear interpolation to the cut-out waveform data so as to be onverted into a $2^k$-sample data.

Furthermore, the aforementioned phase detection may be performed by using a real part and an imaginary part of the data obtained by the orthogonal conversion, so as to calculate an inverse tangent ($\tan^{-1}$) to obtain a phase of each higher harmonics component.

DETAILED DESCRIPTION OF PREFERRED EMBODIMENTS

The phase detection apparatus and method according to the present invention is to be applied, for example, to multi-band excitation (MBE) coding, sinusoidal transform coding (STC), harmonic coding, and other sinusoidal wave combine coding as well as to the aforementioned sinusoidal wave combine coding, used to a linear predictive coding (LPC).

Here, before starting, description of the embodiment of the present invention, and explanation will be given on an audio coding apparatus that carries out a sinusoidal wave analysis-synthesis (combine) coding as an apparatus to use the phase detection apparatus or method according to the present invention.

Figure 1:
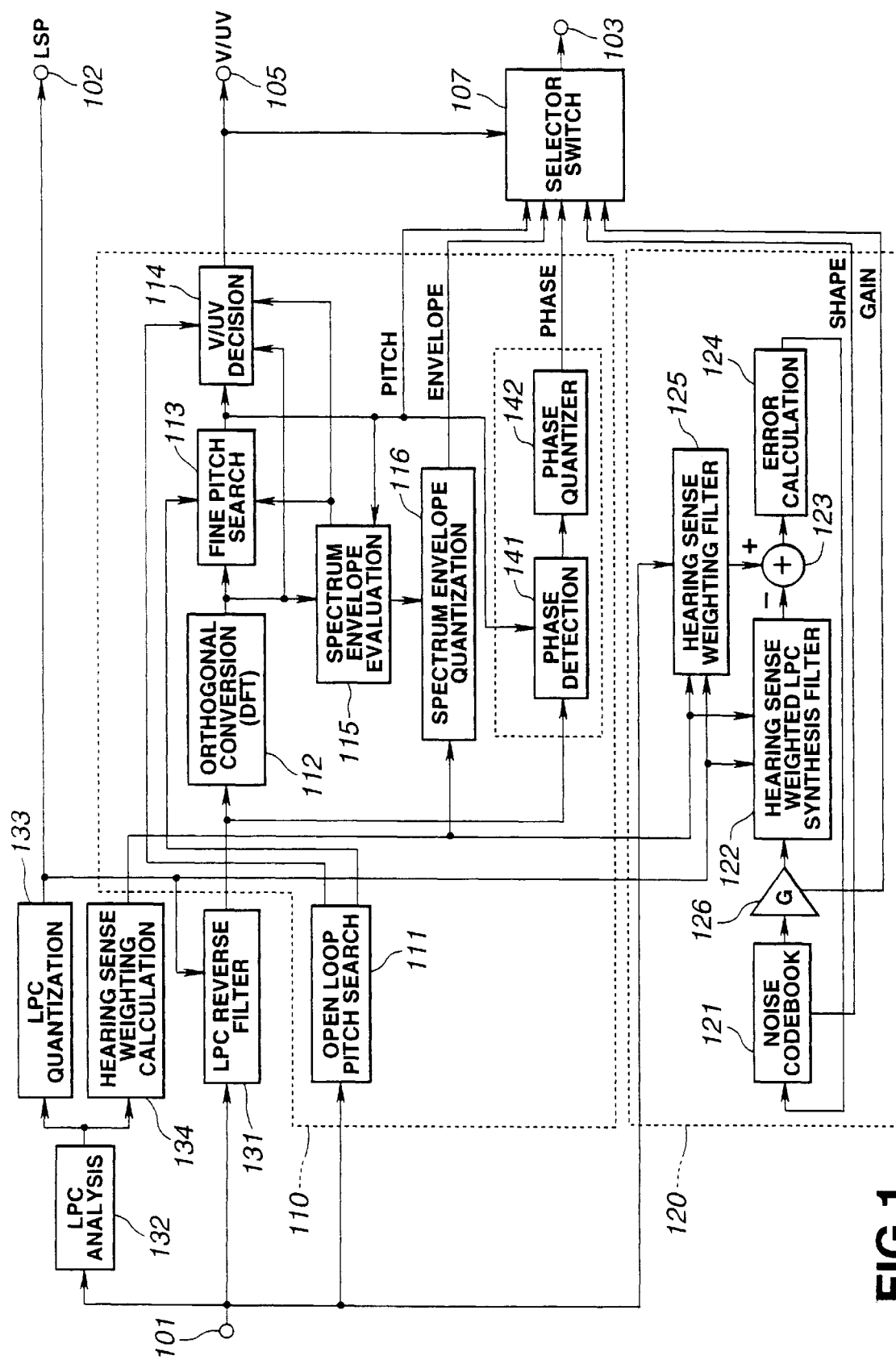
FIG. 1 is a block diagram schematically showing a configuration example of an audio coding apparatus to employ a phase detection apparatus and method according to an embodiment of the present invention.

FIG. 1 schematically shows a specific configuration example of the audio coding apparatus to which the aforementioned phase detection apparatus or method is to be applied.

The audio signal coding apparatus of FIG. 1 includes: a first encoder 110 for carrying out a sinusoidal analysis coding such as harmonic coding to an input signal; and a second encoder 120 for carrying out to the input signal a code excitation linear predictive (CELP) coding using a vector quantization by way of closed loop search of an optimal vector using an analysis by synthesis (combine) for example, so that the first encoder 110 is used for a voiced part of the input signal and the second encoder 120 is used for an unvoiced part of the input signal. The phase detection according to the embodiment of the present invention is applied to the first encoder 110. It should be noted that in the example of FIG. 1, a short-term prediction residue such as a linear predicitive coding (LPC) residue of an input audio signal is obtained before the input audio signal is fed to the first encoder 110.

In FIG. 1, the audio signal fed to an input terminal 101 is transmitted to an LPC reverse filter 131 and an LPC analyzer 132 as well as to an open loop pitch searcher 111 of the first encoder 110. The LPC analyzer 132 applies a hamming window over a block of an analysis length equal to about 256 samples of the input signal waveform and uses the self-correlation method to obtain a linear prediction coefficient, i.e., a so-called alpha parameter. The data output unit, i.e., the framing interval is set to about 160 samples. Here, if the input audio signal has a sampling frequency fs of 8 kHz, one frame interval is 160 samples, 20 msec.

The alpha parameter from the LPC analyzer 132 is converted into a linear spectrum pair (LSP) parameter by way of alpha to LSP conversion. For example, the alpha parameter obtained as a direct type filter coefficient is converted into ten, i.e., five pairs of LSP parameter. The conversion is carried out by way of Newton-Raphson method for example. This conversion into LSP parameter is carried out because the LSP parameter has a superior interpolation characteristic than the alpha parameter. This LSP parameter is matrix-quantized or vector-quantized by an LSP quantizer 133. Here, it is possible to obtain a difference between frames before carrying, out the vector quantization, or it is possible to carry out the matrix quantization for a plurality of frames at once. Here, 20 msec is assumed to be one frame, and the LSP parameters are calculated for each 20 msec. LSP parameters of two frames are together subjected to the matrix quantization and the vector quantization.

This LSP quantizer 133 outputs a quantized output, i.e., an index of the LSP quantization is taken out via a terminal 102, whereas the LSP vector which has been quantized is subjected, for example, to an LSP interpolation and LSP to alpha conversion into an alpha parameter of the LPC, which is directed to the LPC reverse filter 131 as well as to a hearing, sense-weighted LPC combine filter 122 and a hearing, sense-weighting filter 125 of the second encoder 120 which will be detailed later.

Moreover, the alpha parameter from the LPC analyzer 132 is transmitted to a hearing sense-weighting filter calculator 134 to obtain a data for hearing sense weighting. This weighting data is transmitted to a hearing sense weighted vector quantizer 116 which will be detailed later as well as to a hearing sense weighted LPC combine filter 122 and hearing sense weighting filter 125 of the second encoder 120.

In the LPC reverse filter 131, a reverse filtering processing is performed using the aforementioned alpha parameter to take out a linear prediction residue (LPC residue) of the input audio signal. An output from this LPC reverse filter 131 is transmitted to the first encoder 110 so as to be subjected to sinusoidal coding such as harmonic coding by the orthogonal converter 112 such as the discrete Fourier transform (DFT) circuit and the phase detector 140.

Moreover, the open loop pitch searcher 111 of the encoder 110 is supplied with the input audio signal from the input terminal 101. The open loop pitch searcher 111 determines an LPC residue of the input signal and performs a rough pitch search by way of the open loop. A rough pitch data extracted is fed to a high-accuracy pitch searcher 113 to be subjected to a high-accuracy pitch search (fine search of a pitch) by way of a closed loop which will be detailed later. Moreover, the open loop pitch searcher 111 outputs together with the aforementioned rough pitch data, a normalized self-correlation maximum value r (p) which is the maximum value of self correlation of the LPC residue, and transmitted to a V/UV decider 114.

In the orthogonal converter 112, for example, an orthogonal conversion such as discrete Fourier transform (DFT) is performed so that an LPC residue on time axis is converted into a spectrum amplitude data on a frequency axis. An output from this orthogonal converter 112 is transmitted to the fine pitch searcher 113 and to a spectrum envelope evaluator 115 for evaluation of a spectrum amplitude or envelope.

The fine pitch searcher 113 is supplied with the rough pitch data extracted in the open loop pitch searcher 111 and the data on the frequency axis after the DFT for example, in the orthogonal converter 112. In the fine pitch searcher 113, around the aforementioned rough pitch data value, at an interval of 0.2 to 0.5, plus and minus several samples are selected to obtain a fine pitch data with an optimal floating point. As the fine search technique, a so-called analysis-by-synthesis method is used to select a pitch so that a power spectrum synthesized is at nearest to the original audio power spectrum. Information on the pitch data from the fine pitch searcher 146 using such a closed loop is transmitted to the spectrum envelope evaluator 115, the phase detector 141, and a selector switch 107.

In the spectrum envelope evaluator 115, according to the spectrum amplitude and pitch as an output of orthogonal conversion of the LPC residue, size of respective harmonics and their spectrum envelope are evaluated. The evaluation result is transmitted to the fine pitch searcher 113, V/UV (voiced/unvoiced) decider 114 and to a spectrum envelope quantizer 116. The spectrum envelope quantizer 116 is a hearing sense weighted vector quantizer.

In the V/UV (voiced/unvoiced) decider 114, a frame is decided to be voiced or unvoiced according to the output from the orthogonal converter 112, the optimal pitch from the fine pitch searcher 113, the spectrum amplitude data from the spectrum envelope evaluator 115, and the normalized self-correction maximum value r (p) from the open loop pitch searcher 111. Furthermore, a boundary position of V/UV decision for each band in case of MBE may also be used as a condition to make the V/UV decision. The decision made by this V/UV decider 115 is taken out via an output terminal 105.

On the other hand, a data count converter (a kind of sampling rate converter) is provided at the output of the spectrum evaluator 115 or the input of the spectrum envelope quantizer. This data count converter is used to keep a constant number of the envelope amplitude data items |Am|, considering that the number of divided bands on the frequency axis varies depending on the aforementioned pitch. That is, suppose the valid band is up to 3400 kHz. This valid band is divided to 8 to 63 bands according to the aforementioned pitch. Accordingly, the number of amplitude data items |Am| also changes from 8 to 63. To cope with this, the aforementioned data count converter converts this variable number of amplitude data items into a constant number such as 44 items.

The data count converter provided at the output of the spectrum envelope evaluator 115 or the input of the envelope quantizer 116 outputs the aforementioned constant number (for example, 44) of amplitude data or envelope data which are gathered by the spectrum envelope quantizer 116 into a predetermined number, for example, 44 data items that are subjected as a vector to the weighted vector quantization. This weight is given by an output from the hearing sense weighting filter calculation circuit 134. The index of the envelope from the spectrum envelope quantizer 116 is fed to the selector switch 107.

The phase detector 141 detects a phase in formation including a phase and a fixed delay component of the phase for each harmonics (higher harmonics) of the sinusoidal coding as will be detailed later. This phase information is transmitted to a phase quantizer 142 for quantization and the phase data quantized is transmitted to the selector switch 107.

The selector switch 107 is responsive to the V/UV decision output from the V/UV decider 115 to switch for output from the terminal 103 between the pitch, the vector quantized index of the spectrum envelope, and phase data from the first encoder 110, and a shape and gain data from the second encoder 120 which will be detailed later.

The second encoder 120 of FIG. 1 has a configuration of code excitation linear prediction (CELP) coding in this example. An output from a noise codebook 121 is subjected to combine processing by the combine filter 122. The weighted audio thus obtained is fed to a subtractor 123, so as to take out a difference between the audio signal supplied to the input terminal 101 and the audio obtained via the hearing sense weighting filter 125. This difference is supplied to a distance calculation circuit 124 to perform a distance calculation, and the noise codebook 121 is searched for a vector which minimizes the difference. That is, a vector quantization of waveform on time axis is performed using a closed loop search by way of the analysis-by-synthesis method. This CELP coding is used for coding of the unvoiced part as has been described above. The codebook index as an UV data from the noise codebook 121 is taken out from the output terminal 107 via the selector switch 107 when the V/UV decision result from the V/UV decider 115 is unvoiced (UV).

Next, explanation will be given on a preferred embodiment of the present invention.

The phase detection apparatus and method according to an embodiment of the present invention is used in the phase detector 141 of the audio signal coding apparatus shown in FIG. 1 but not to be limited to this application.

Figure 2:
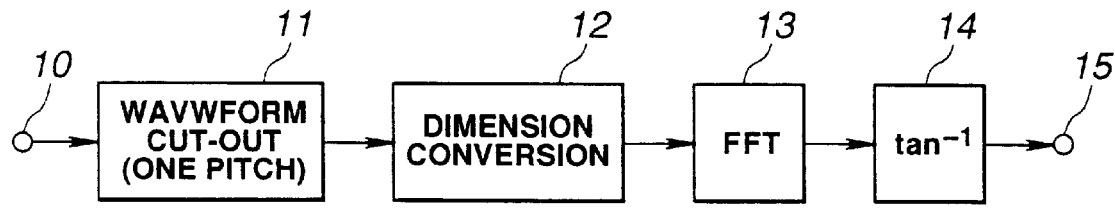
FIG. 2 is a block diagram schematically showing the phase detection apparatus according to the embodiment of the present invention.
Figure 3:
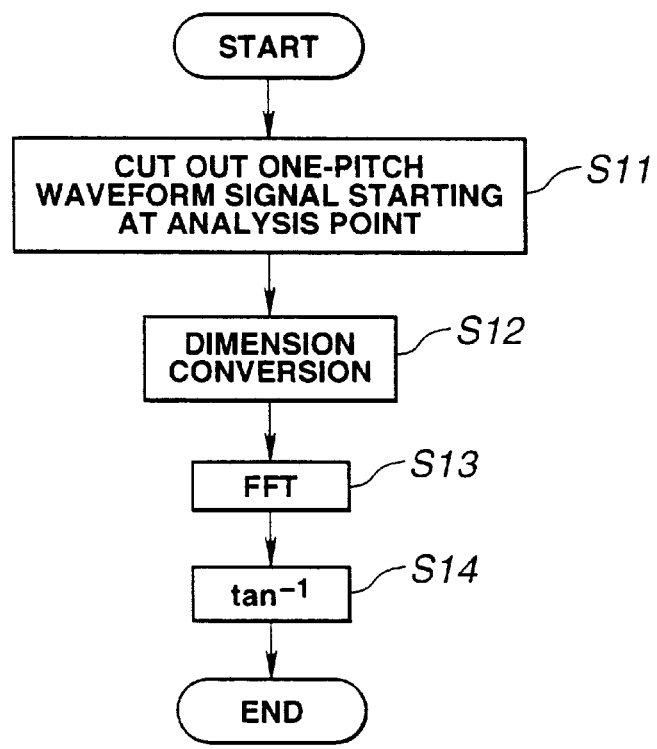
FIG. 3 is a flowchart explaining the phase detection method according to the embodiment of the present invention.

Firstly, FIG. 2 is a block diagram schematically showing the phase detection apparatus according to a preferred embodiment of the present invention. FIG. 3 is a flowchart for explanation of the phase detection method according to a preferred embodiment of the present invention.

Figure 4:
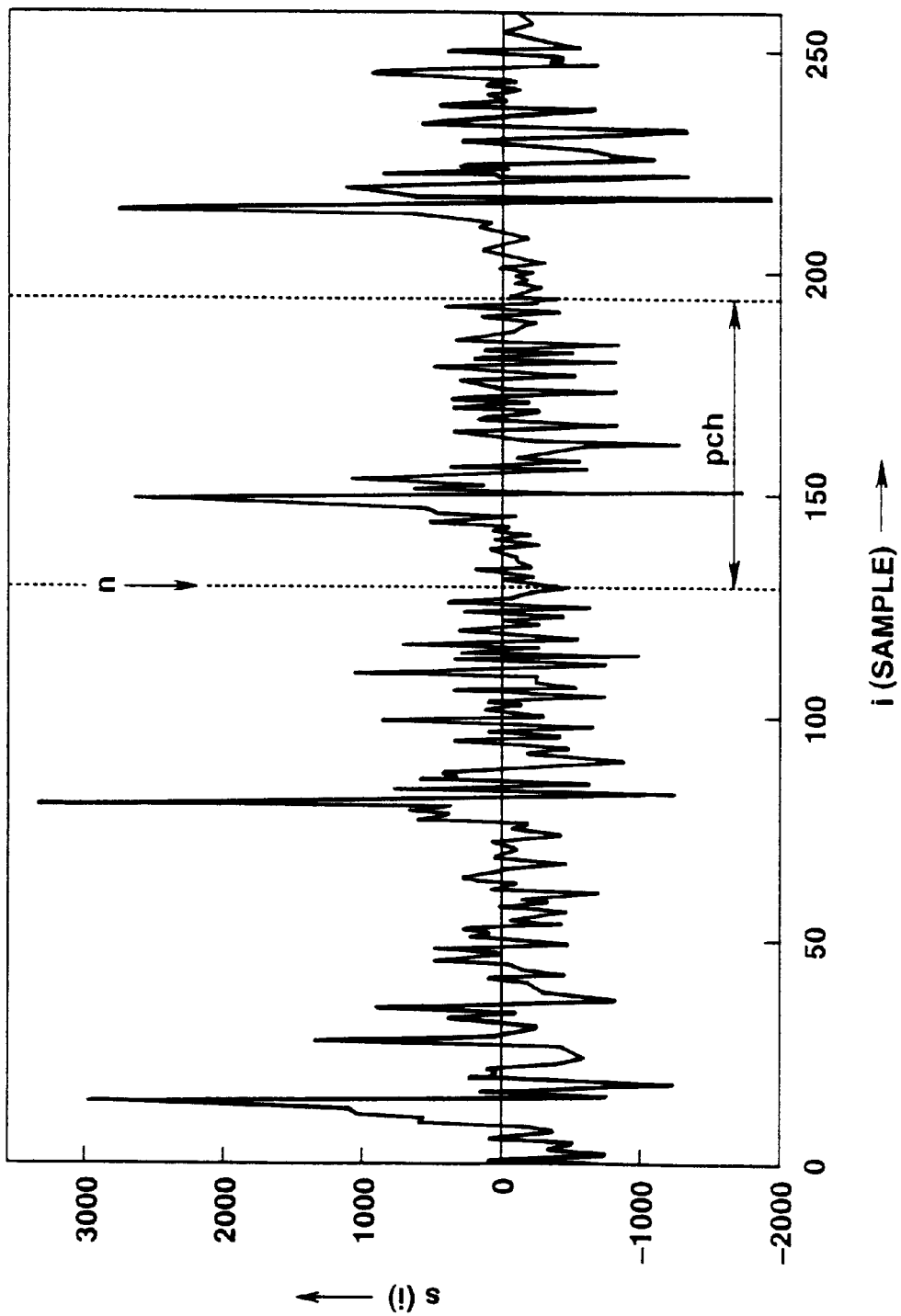
FIG. 4 is a waveform chart showing an example of an input signal to be subjected to the phase detection.

An input signal supplied to an input terminal 10 of FIG. 2 may be a digitized audio signal itself or a short-term prediction residue signal (LPC residue signal) of a digitized audio signal such as a signal from the LPC evere filter 131 of FIG. 1. From this input signal, a waveform signal of one-pitch cyucle is cut out by a waveform cutter 11 as step S11 in FIG. 3. As shown in FIG. 4, a number of samples (pitch lag) pch corresponding to one pitch cycle are cut off starting at an analysis point (time) in an analysis block of the input signal (audio signal or LPC residue signal) s (i). In the example of FIG.4, the analysis block length is 256 samples, but not to be limited to this. Moreover, the horizontal axis of FIG. 4 represents a position in the analysis block or time as the number of samples. The aforementioned analysis point n (position or time) represents the n-th sample from the analysis start.

Here, the analysis block around the aforementioned time n (sample) has a pitch lag pch (sample). Accordingly, the basic frequency (angular frequency) $\omega_0$ at time n can be expressed follows.

$$\omega_0 = 2\pi/\text{pch} \qquad (1)$$

M harmonics (higher harmonics) are arranged at an interval $\omega_0$ within the range of 0 to $\pi$ on the frequency axis. This M can be expressed as follows.

$$M = \text{pch}/2 \qquad (2)$$

Figure 5B:
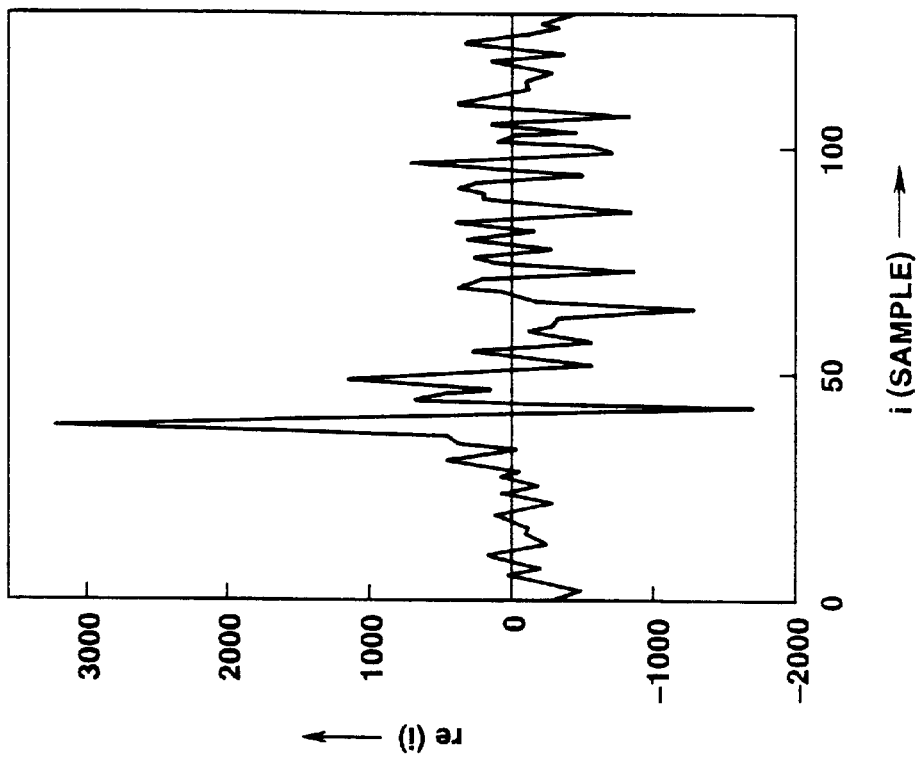
FIG. 5B shows a waveform after a dimension conversion.
Figure 5A:
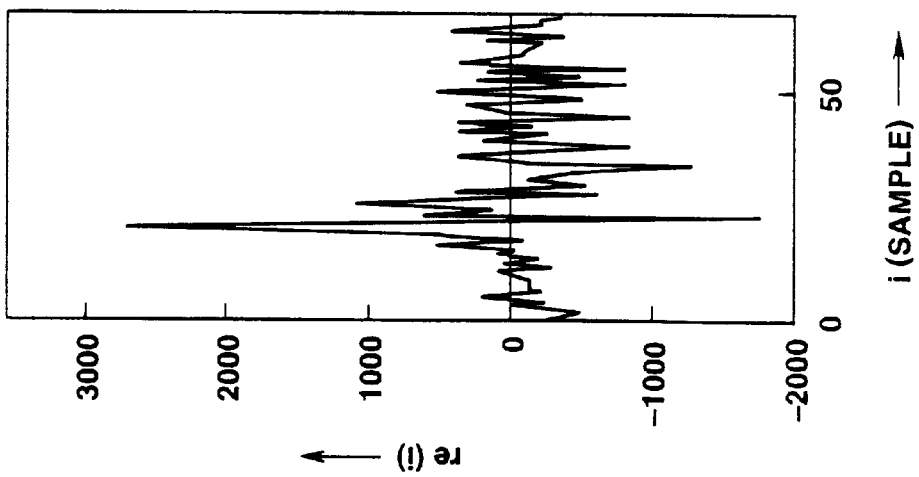
FIG. 5A shows an example of a waveform for one pitch.

This one-pitch waveform signal which has been cut out is subjected to a dimension conversion by the dimension converter 12 as step S12 in FIG. 3. This dimension conversion is performed as shown in FIG. 5. The waveform signal of he pch sample of the aforementioned one-pitch lag is dimension-converted into $2^k$ samples, i.e., $2^7=128$ samples in this embodiment so as to obtain a signal string re(i) (wherein $0 \leq i < 2^k$). A specific example of the dimension conversion will be detailed later.

The aforementioned signal string re(i) is assumed to be a real number part, assuming im(i) as an imaginary number part.

$$\text{im}(i) = 0 \ (0 \leq i < 2^k)$$

In step S13 of FIG. 3, an FFT processer 13 performs $2^k$-point, for example 128-point, FFT (fast Fourier transform) to the real number signal string re(i) and the imaginary number signal string im(i).

In step S14 of FIG. 3, the result of this FFT is transmitted to a $\tan^{-1}$ processor 14, where $\tan^{-1}$ (reverse tangent) is calculated to obtain the phase. If it is assumed that the FFT result has a real number part Re(i) and an imaginary number part Im(i), $0 \leq i < 2^{k-1}$ corresponds to 0 to $\pi$ (rad) on the frequency axis. The component $1 \leq i \leq M$ corresponds to the aforementioned M harmonics (higher harmonics) components. That is, the m-th harminics has a phase $\phi_m = \phi(m \times \omega_0)$ (wherein $1 \leq m \leq M$) which can be expressed as follows.

$$\phi_m = \tan^{-1}\left(\frac{I_m(m)}{R_c(m)}\right) \quad (1 \leq m \leq M) \qquad (3)$$

Figure 6:
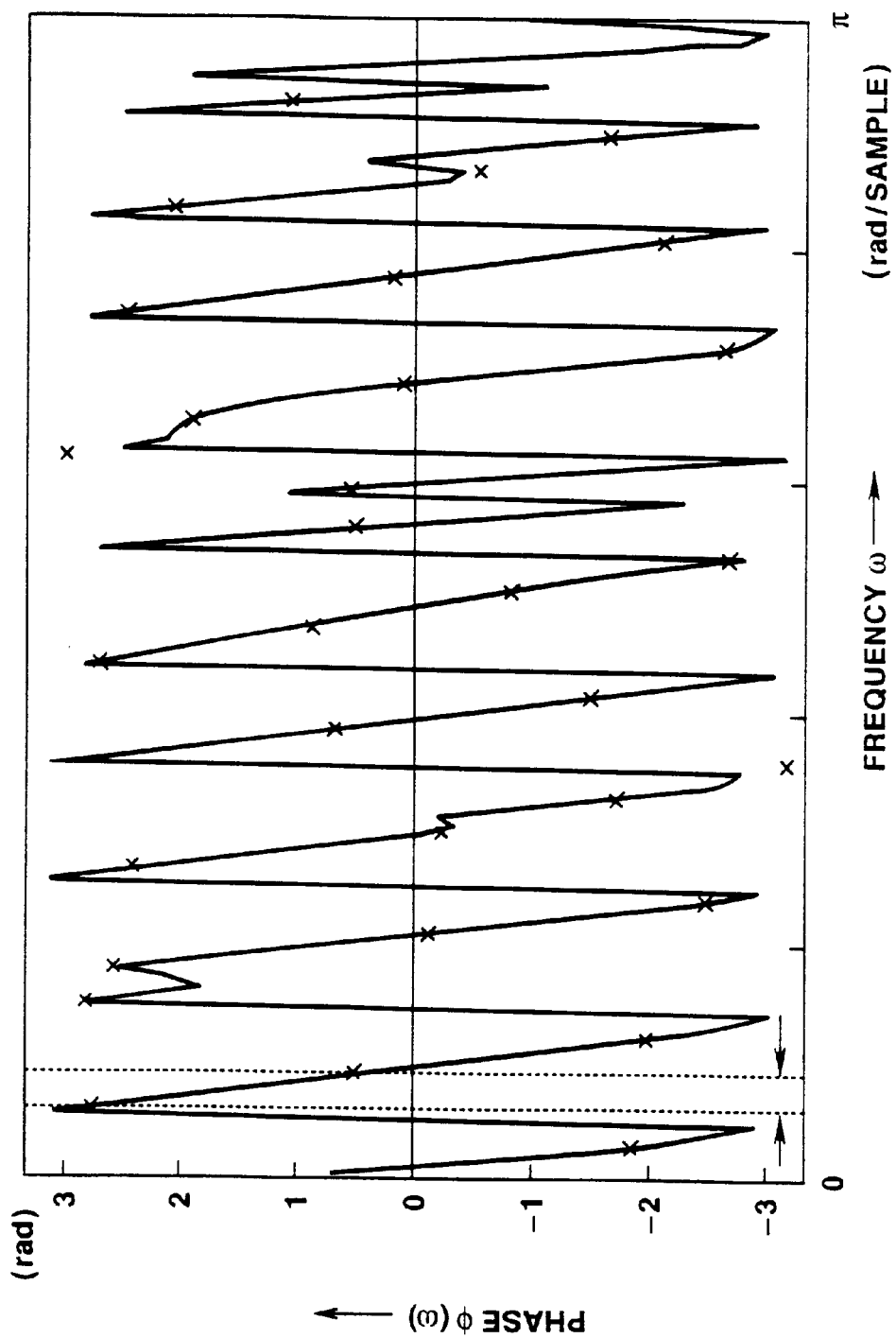
FIG. 6 shows an example of phase detected.

The phase data obtained is taken out via an output terminal 15. FIG. 6 shows a specific example of this phase data. In FIG. 6, each of the crosses (X) represents a phase of harmonics. As is clear from the aforementioned Formula (3), the respective samples of the FFT result directly represent the phases of respective harmonics. Thus, the phases of the respective harmonics are directly expressed in the FFT result. That is, there is no need of interpolation processing or the like to obtain a phase with frequency of each harmonics. This enables to reduce the number of FFT points.

For example, if the sampling frequency of the input audio signal is 8 kHz, the average pitch lag pch from a high lady's voice down to a low gentleman's voice is 20 to 147 (samples). Accordingly, the lowest pitch frequency is 8000/147≈54 (Hz). If the valid band is assumed to be 3.4 kHz, up to 62 harmonics are present. Consequently, it is necessary to obtain phases at 62 points or more in a range from 0 to $\pi$. Because the minimum integer k that satisfies $$62 \leq 2^{k-1}$$

is 7. Therefore, it is sufficient to perform the 128-point FFT as has been described above.

Next, explanation will be given on a specific example of the aforementioned dimension conversion. This dimension conversion can be realized, for example, by the oversampling ahd linear interpolation.

Figure 7:
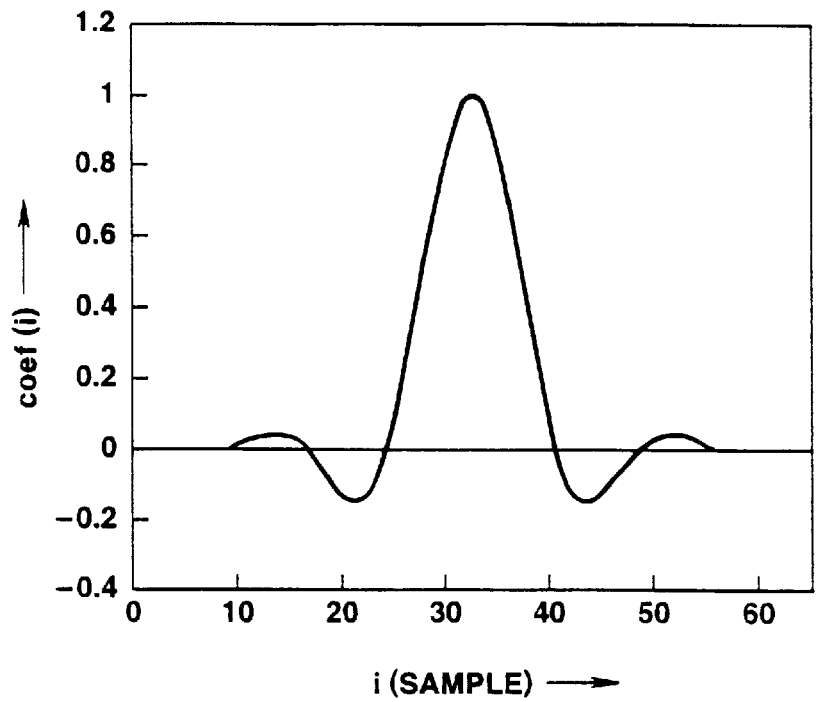
FIG. 7 shows an example of filter coefficient of an oversampling filter for dimension conversion.
Figure 8:
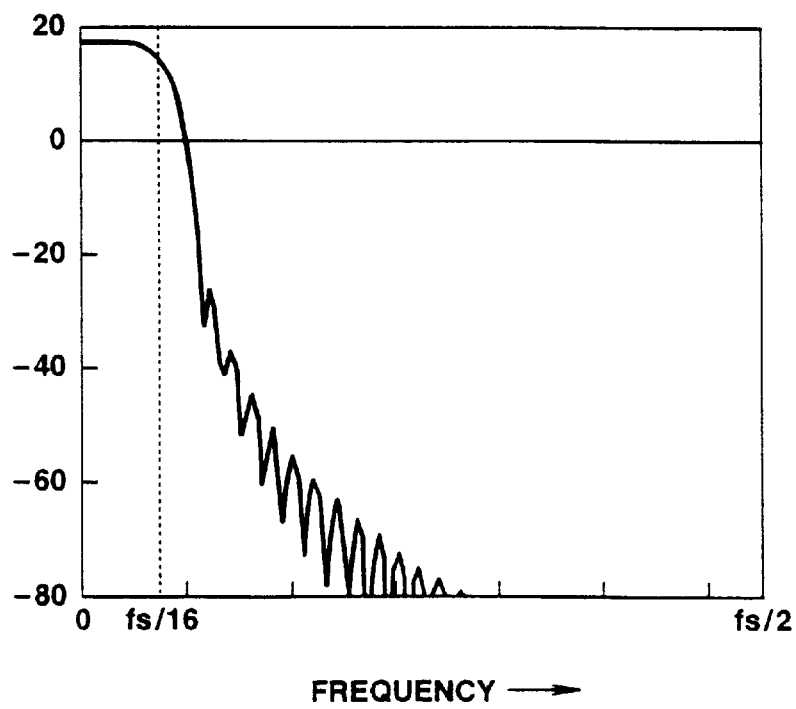
FIG. 8 shows an example of filter characteristic of the oversampling filter for dimension conversion.

For example, if 8 kHz is the sampling frequency of the input audio signal, the pitch lag pch expected is about 20 to 147 (samples). Accordingly, one-pitch waveform is dimension-converted so as to obtain $2^7=128$ samkples. In this case, 8-multiplication oversampling is performed using the oversampling filter having a filter coefficient as shown in FIG. 7 and a frequency characteristic as shown in FIG. 8, so that only the necessary 128 points are obtained by way of linear interpolation. The filter coefficient coef(i) of the oversampling shown in FIG. 7 can be expressed as follows.

$$coef\ [i] = \frac{\sin \pi(i-32)/8}{\pi(i-32)}\left(0.5 - 0.5\cos 2\frac{\pi i}{64}\right) \quad 0 \leq i \leq 64 \tag{4}$$

Figure 9:
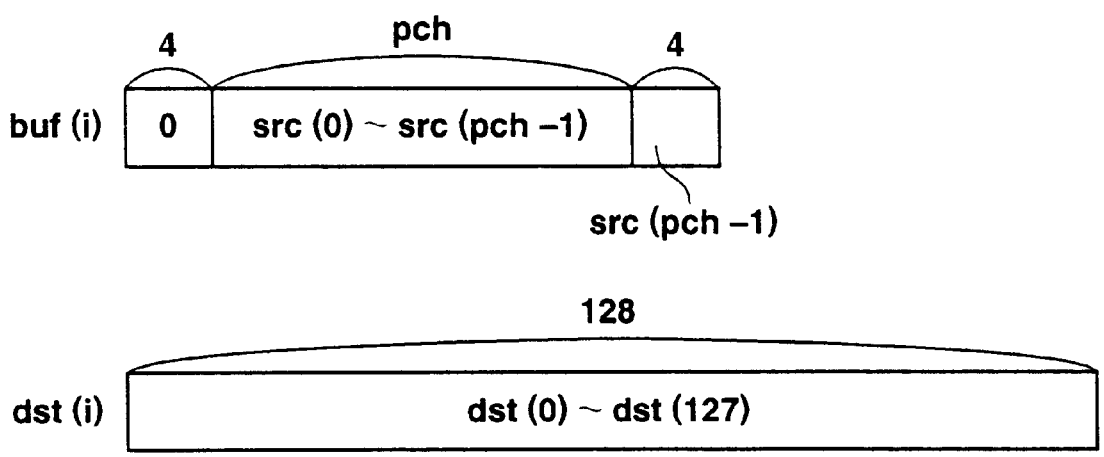
FIG. 9 shows an example of memory to store variables used for the dimension conversion processing.
Figure 10:
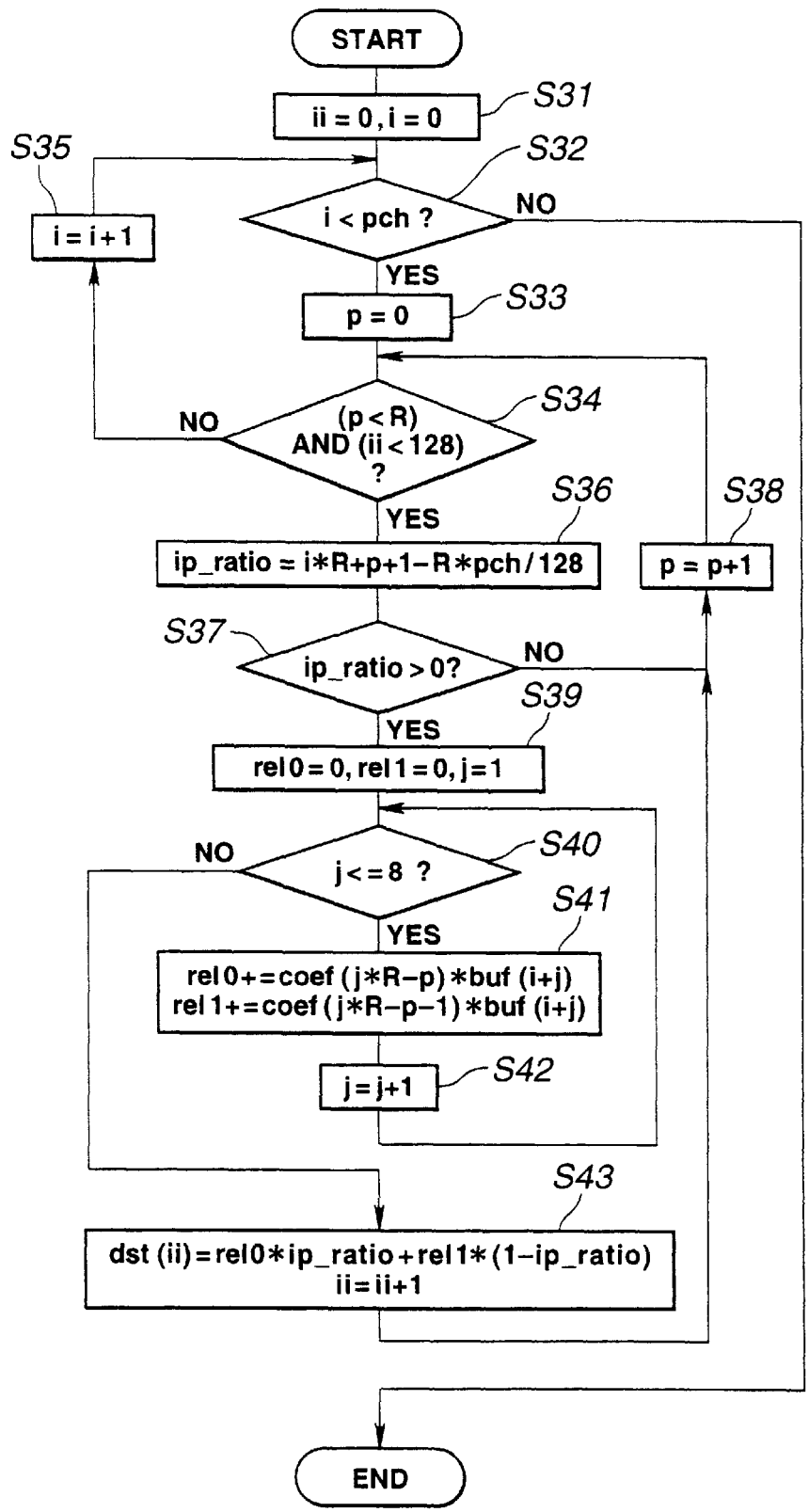
FIG. 10 is a flowchart explaining an example of the dimension conversion procedure.

FIG. 9 and FIG. 10 explain a specific example of this dimension conversion processing. FIG. 9 shows a data configuration stored in memory for this processing. FIG. 10 is a flowchart showing the processing procedure of this dimension conversion.

FIG. 9 shows the data stored in memory prior to the dimension conversion processing. Each variable buf(i) stored in a buffer memory is of a dimension with four samples added to the head and end of the aforementioned pitch lag pch sample. 0 is written in the area of the first four samples; in the subsequence area of samples pch, the one-pitch waveform data (waveform data before the dimension conversion) cut out from the aforementioned input signal src (0) to src (pch−1) are written; and in the subsequent area of four samples, the last data src (pch−1) of the one-pitch waveform data is written. Moreover, a data of $2^k$ samples (for example, 128 samples) after the dimension conversion processing is written as dst (0) to dst (127) in the 128-dimension variable dst (i).

When performing the dimension conversion processing using such a memory, it is possible to use the 8-multiplication oversampling filtering in combination with the interpolation processing as shown in FIG. 10 for conversion into 128-sample data. In step S31 of FIG. 10, variables ii and i are initialized into 0. The variable ii is used for the output sample count and the variable i is used for the input sample count. In steps S32 to S34 in step processing of the pch sample entered is performed while incrementing the i in step S35 until i exceeds pch. In steps S34 to S43, the input pch sample is multiplied by the filter coefficient coef so as to obtain the sample value at the positions of 128 samples by way of interpolation processing (steps S41 and S42). In steps S34 and S36, the fixed value R is 8, and the processing is controlled to repeat while the variable p is incremented from 0 to 7 in step S38. The "ip_ratio" in steps S36, S37, S43, and "rel0,rel1" in steps S39, S41, S43 represent numerics showing a relationship between the input sample for interpolation and the output sample, and the distribution ratio of the input sample. The dimension conversion processing shown in this FIG. 10 is performed by the ordinary 8-multiplication oversampling processing in combination with the interpolation processing.

On the other hand, there is another method to obtain phases of the respective harmonics (higher harmonics). That is, one-pitch cycle is cut out from an input signal, the cut out waveform data is filled with zeroes to obtain $2^N$ samples (wherein N is an integer, and $2^N$ is more than the number of samples corresponding to the aforementioned one pitch, for example, 256), which are then subjected an orthogonal conversion such as the FFT. The real part and the imaginary part of the obtained data are used to calculate the reverse tangent ($\tan^{-1}$) so as to obtain a phase. This phase is subjected to the interpolation processing, thus obtaining a phase for each of the higher harmonics. In this case, the phase after the FFT appears in no relation with the aforementioned pitch frequency. Accordingly, it is necessary to calculate a phase for each of the harmonics (higher harmonics) by the interpolation processing.

Thus, in this case, without performing the dimension conversion, the FFT is performed, which is followed by the interpolation processing to obtain a phase of each of harmonics. On the other hand, in the case of the present embodiment, one-pitch cycle, i.e., 20 to 147 samples are dimension-converted into $2^k$ samples before subjected to the FFT processing to directly obtain the phase of harmonics. The comparison between these two cases will be given below with reference to FIG. 11A to FIG. 11D, which show examples where a 128-sample FFT is performed. The FFT results are shown in spectrum.

Figure 11:
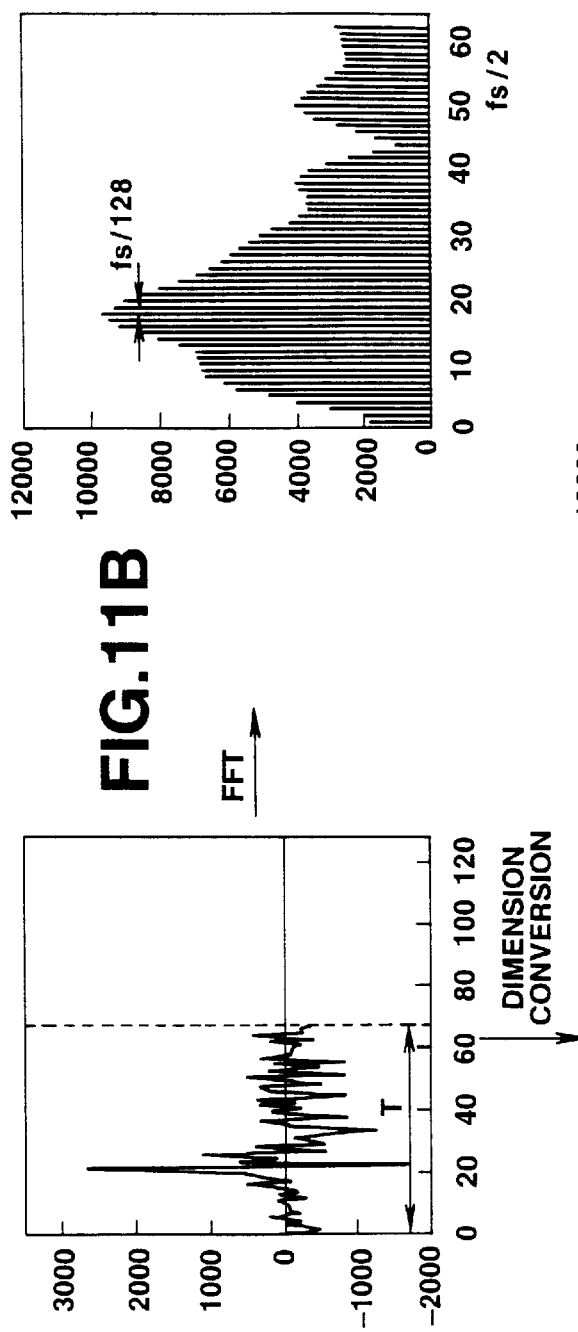
FIG. 11A to FIG. 11D explaining the meaning of dimension conversion to be carried out prior to FFT processing.

FIG. 11A shows the pch samples cut off from the input signal anre the remaining part was filled with zeroes so as to obtain 128 samples (generaly, $2^k$ samples), which were subjected to the FFT processing to obtain the spectrum shown in FIG. 11B. The spectrum interval is fs/128 when assuming fs as the sampling frequency. On the other hand, FIG. 11C shows the waveform data of pch samples dimension-converted into 128 samples (generally, $2^k$ samples). Here, the sampling frequency is changed into fs' by the dimension conversion. This is subjected to the FFT processing, after which the spectrum interval is fs'/128. This sampling frequency fs' after the dimension conversion will be detailed below.

Firstly, the pitch lag is pch (sample) and accordingly, the pitch frequency T before the dimension conversion can be expressed as follows $$T=pch/fs \tag{5}$$

The relationship between this pitch frequency T and the aforementioned sampling frequency fs' after the dimension conversion can be expressed as follows.

$$T=2^k/fs'=128/fs' \tag{6}$$

Therefore, $$pch/fs=2^k/fs'=128/fs' \tag{7}$$

Consequently, the pitch frequency $f_0$ (Hz) for the pitch frequency T is expressed as follows.;

$$f_0=fs/pch=fs'/2^k=fs'/128 \tag{8}$$

This result eans that if the dimension-converted waveform data of FIG. 11C is subjected to the FFT processing, the interval of the spectrum obtained becomes $f_0$ as shown in FIG. 11D. Accordingly, as for the phase, when the dimension conversion precedes the FFT processing, it is possible to directly obtain a phase of each of the harmonics.

Thus, by performing the dimension converson before the FFT processing, it is possible to directly obtain a phase of each of the harmonics without performing the linear interpolation or the like after the FFT. That is, it is possible to eliminate the phase interpolation as well as to reduce an error caused by the interpolation.

Figure 12:
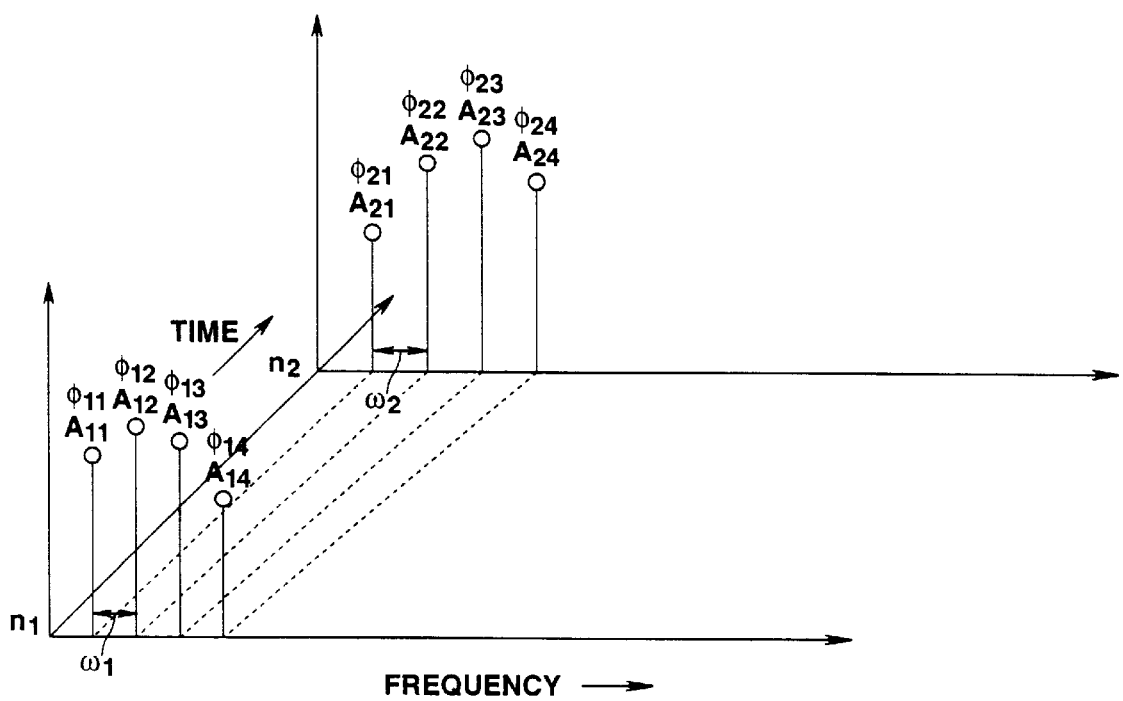
FIG. 12 explains an example of sinusoidal wave combine when a phase information is obtained.

Next, using the phase information obtained as has been described above, a sinusoidal wave synthesis (combine) is performed. Referring to FIG. 12, from time $n_1$ to $n_2$, explanation will be given on a case of sinusoidal synthesis of a time waveform at a frame interval $L=n_2-n_1$.

If the pitch lag at time $n_1$ is $pch_1$ (sample) and the pitch lag at time $n_2$ is $pch_2$ (sample), the pitch frequency $\omega_1$ and $\omega_2$ (rad/sample) at time $n_1$ and $n_2$ are as follows.

$$\omega_1=2\pi/pch_1$$

$$\omega_2=2\pi/pch_2$$

Moreover, the amplitude data of each harmonics component is assumed to be $A_{11}, A_{12}, A_{13}, \ldots$ at time $n_1$; and $A_{21}, A_{22}, A_{23}, \ldots$ at time $n_2$. The phase data of each harmonics component is assumed to be $\phi_{11}, \phi_{12}, \phi_{13}, \ldots$ at time $n_1$; and $\phi_{21}, \phi_{22}, \phi_{23}, \ldots$ at time $n_2$.

When the pitch is continuous, the m-th harmonics component at time n ($n_1 \leq n \leq n_2$) has an amplitude that can be obtained as follows using linear interpolation of the amplitude data at time $n_1$ and $n_2$.

$$A_m(n) = \frac{n_2 - n}{L} A_{1m} + \frac{n - n_1}{L} A_{2m} \quad (n_1 \leq n \leq n_2) \tag{9}$$

Suppose that the frequency change of the m-th harmonics component between the time $n_1$ and $n_2$ is (linear component)+(fixed fluctuaton) as shown below.

$$\tilde{\omega}_m(n) = m\tilde{\omega}_1 \frac{n_2 - n}{L} + m\tilde{\omega}_2 \frac{n - n_1}{L} + \Delta\tilde{\omega}_m \quad (n_1 \leq n \leq n_2) \tag{10}$$

Here, the m-th harmonics component at time n has a phase $\theta_m(n)$(rad) which can be expressed by Expression (12). By calculation of the Expression (12), it is possible to obtain Expression (13) below.

$$\theta_m(n) = \int_{nl}^{n} \tilde{\omega}_m(\xi) d\xi + \phi_{1m} \tag{11}$$

$$= \int_{nl}^{n} \left( m\tilde{\omega}_1 \frac{n_2 - \xi}{L} + m\tilde{\omega}_2 \frac{\xi - n_1}{L} + \Delta\tilde{\omega}_m \right) d\xi + \phi_{1m} \tag{12}$$

$$= m\tilde{\omega}_1(n - n_1) + m(\tilde{\omega}_2 - \tilde{\omega}_1)\frac{(n - n_1)^2}{2L} + \Delta\tilde{\omega}_m L + \phi_{1m} \tag{13}$$

the m-th harmonics at time $n_2$ has a phase $\phi_{2m}$(rad) which can be expressed by Expression (15) below.

$$\phi_{2m} = \theta_m(n_2) \tag{14}$$

$$= \frac{m(\tilde{\omega}_1 + \tilde{\omega}_2)L}{2} + \Delta\tilde{\omega}_m L + \phi_{1m} \tag{15}$$

Consequently, each harmonic component has a frequency change $\Delta\omega_m$ (rad/sample) expressed by Expression (16).

$$\Delta\tilde{\omega}_m = \frac{(\phi_{1m} - \phi_{2m})}{L} - \frac{m(\tilde{\omega}_1 + \tilde{\omega}_2)}{2} \tag{16}$$

For the m-th harmonics component, phase $\phi_{1m}$ and $\phi_{2m}$ at time $n_1$ and $n_2$ are given. Accordingly, it is possible obtain the fixed fluctuation $\Delta\omega_m$ of the frequency change from the Expresson (16) and the phase $\theta_m$ at time n from the Expression (13). Thus, time waveform $W_m(n)$ by the m-th harmonics component can be expressed as follows.

$$W_m(n) = A_m(n)\cos(\theta_m(n))(n_1 \leq n \leq n_2) \tag{17}$$

The time waveforms for all the harmonics thus obtained are summed up into a synthesized (combined) wveform V(n) as shown in Expressions (18) and (19) below.

$$V(n) = \sum_m W_m(n) \tag{18}$$

$$= \sum_m A_m(n)\cos(\theta_m(n)) \quad (n_1 \leq n \leq n_2) \tag{19}$$

Next, explanation will be given when the pitch is discontinues. In case of the discontinues pitch, no consideration is taken on the frequency change continuity. A window is applied to the waveform $V_1(n)$ of Expression (20) obtained by sinusoidal synthesis forward from time $n_1$, and also to the waveform $V_2(n)$ of Expression (20) obtained by sinusoidal synthesis backward from time $n_2$, so that these wveforms are subjected to overlap add.

$$V_1(n) = \sum_m A_{1m}\cos(m\tilde{\omega}_1(n - n_1) + \phi_{1m}) \tag{20}$$

$$V_2(n) = \sum_m A_{2m}\cos(-m\tilde{\omega}_2(n_2 - n) + \phi_{2m}) \tag{21}$$

According to the phase detection apparatus having the aforementioned configuration, it is possible to rapidly detect a phase of a desired harmonics component using a predetectded pitch frequency by way of the FFT processing and the linear interpolation. This enables to realize a waveform reproduction (regeneration) in an audio signal sinusoidal encoding or an audio encoding using sinusoidal encoding on the LPC residue of the audio signal.

It should be noted that the present invention is not to be limited to the aforementioned embodiment. In the configuration of FIG. 1, the respective components are described as hardward, but it is also possible to realize these components by a software program using a so-called DSP (digital signal processor).

As is clear from the aforementioned explanation, in the phase detection apparatus and method according to the present invention, one-pitch cycle is cut out from an input signal waveform based on an audio signal on a time axis, and samples of the cut out one-pitch cycle are subjected to dimension conversion into a $2^k$-sample data, which is then subjected to an orthogonal conversion such as $2^k$-point FFT. A real part and an imaginary part of the orthogonally converted data are used to detect a phase information of each higher harmonics component of the input signal, thus enabling to easily detect the phase information of the original waveform, improving the waveform reproductivity.

Using a predetected pitch for the dimension conversion and the FFT (fast Fourier transform), it is possible to rapidly detect the phase of each harmonics (higher harmoncs) component. When this is applied to sinusoidal encoding, it is possible to enhance the waveform reproductivity. For example, it is possible to prevent the synthesize audio from becoming unnatural.

What is claimed is:

1. A phase detection apparatus comprising:
   waveform cut-out means for cutting out on a time axis a one-pitch cycle of an input signal waveform derived from an audio signal;
   dimension conversion means for dimension-converting said cut-out one-pitch cycle of the input signal waveform into $2^k$-sample data: wherein k is an integer;
   orthogonal conversion means for performing orthogonal conversion on said $2^k$-sample data which has been dimension-converted by said dimension conversion means; and phase detection means for detecting phase information of respective higher harmonics components of said input signal waveform according to a real part and an imaginary part of orthogonal data from said orthogonal conversion means.

2. The phase detection apparatus as claimed in claim 1, wherein said input signal waveform is an audio signal waveform.

3. The phase detection apparatus as claimed in claim 1, wherein said input signal waveform is a signal waveform of a short-term prediction residue of an audio signal.

4. The phase detection apparatus as claimed in claim 1, wherein said dimension conversion means includes means for performing dimension conversion into the $2^k$-sample data by oversampling and linear interpolation of said cut-out one-pitch cycle of the input signal waveform from said waveform cut-out means.

5. The phase detection apparatus as claimed in claim 1, wherein said orthogonal conversion means comprises a fast Fourier transform circuit for performing a $2^k$-point fast Fourier transform processing on said $2^k$-sample data from said dimension conversion means.

6. The phase detection apparatus as claimed in claim 1, wherein said phase detection means includes means for obtaining a phase value for each said higher harmonics component by calculating an inverse tangent ($\tan^{-1}$) using a real part and an imaginary part of the orthogonal data from said orthogonal conversion means.

7. A phase detection method comprising:

a waveform cut-out step for cutting out on a time axis a one-pitch cycle of an input signal waveform derived from an audio signal;

a dimension conversion step for dimension-converting said cut-out one-pitch cycle of the input signal waveform into $2^k$-sample data: wherein k is an integer;

an orthogonal conversion step for performing orthogonal conversion on said $2^k$-sample data which has been dimension-converted in said dimension conversion step; and a phase detection step for detecting a phase information of respective higher harmonics components of said input signal according to a real part and an imaginary part of orthogonal data from said orthogonal conversion step.

8. The phase detection method as claimed in claim 7, wherein said dimension conversion step performs a dimension conversion into the $2^k$-sample data by oversampling and linear interpolation of said cut-out one-pitch cycle of the input signal waveform data from said waveform cut-out step.

9. The phase detection method as claimed in claim 7, wherein said phase detection step obtains a phase value for each higher harmonics component by calculating an inverse tangent ($\tan^{-1}$) using a real part and an imaginary part of the orthogonal data from said orthogonal conversion step.

10. An audio coding apparatus for dividing an input signal waveform based on an audio signal into blocks on a time axis, obtaining a pitch for each of said blocks, and performing sinusoidal wave analysis-by-synthesis encoding on each of said blocks, said apparatus comprising:

waveform cut-out means for cutting out on the time axis a one-pitch cycle of said input signal waveform;

dimension conversion means for dimension-converting said cut-out one-pitch cycle of the input signal waveform into $2^k$-sample data: wherein k is an integer equal to or greater than a number of samples of said one pitch cycle;

orthogonal conversion means for performing orthogonal conversion on said $2^k$-sample data which has been dimension-converted by said dimension conversion means; and phase detection means for detecting phase information of respective higher harmonics components of said input signal for said sinusoidal synthesis according to a real part and an imaginary part of orthogonal data from said orthogonal conversion means.

11. The audio coding apparatus as claimed in claim 10, wherein said input signal waveform is an audio signal waveform.

12. The audio coding apparatus as claimed in claim 10, wherein said input signal waveform is a short-term prediction signal of an audio signal waveform.

13. The audio coding apparatus as claimed in claim 10, wherein said dimension conversion means includes means for performing dimension conversion into the $2^k$-sample data by oversampling and linear interpolation of said cut-out one-pitch cycle of the input signal waveform from said waveform cut-out means.

14. The audio coding apparatus as claimed in claim 10, wherein said orthogonal conversion means comprises a fast Fourier transform circuit for performing $2^k$-point fast Fourier transform processing on said $2^k$-sample data from said dimension conversion means.

15. The audio coding apparatus as claimed in claim 10, wherein said phase detection means includes means for obtaining a phase value for each higher harmonics component by calculating an inverse tangent ($\tan^{-1}$) using a real part and an imaginary part of the orthogonal data from said orthogonal conversion means.

16. An audio coding method for dividing an input signal based on an audio signal into blocks on a time axis, obtaining a pitch for each of said blocks, and performing sinusoidal wave analysis-by-synthesis encoding on each of said blocks, said method comprising:

a waveform cut-out step for cutting out on the time axis a one-pitch cycle of said input signal waveform;

a dimension conversion step for dimension-converting said cut-out one-pitch cycle of said input signal waveform into $2^k$-sample data: wherein k is an integer;

an orthogonal conversion step for performing orthogonal conversion on said $2^k$-sample data which has been dimension-converted in said dimension conversion step; and a phase detection step for detecting a phase information of respective higher harmonics components of said input signal for said sinusoidal synthesis according to a real part and an imaginary part of orthogonal data from said orthogonal conversion step.

17. The audio coding method as claimed in claim 16, wherein said dimension conversion step performs a dimension conversion into the $2^k$-sample data by oversampling and linear interpolation of said cut-out one-pitch cycle of the input signal waveform from said waveform cut-out step.

18. The audio coding method as claimed in claim 16, wherein said phase detection step obtains a phase value for each higher harmonics component by calculating an inverse tangent ($\tan^{-1}$) using a real part and an imaginary part of the orthogonal data from said orthogonal conversion step.

* * * * *